US006084316A

United States Patent [19]

[11] Patent Number: 6,084,316
[45] Date of Patent: Jul. 4, 2000

Willmann

[54] MOTORIZED ADJUSTING DEVICE

[75] Inventor: Norbert Willmann, Eisenbach, Germany

[73] Assignee: IMS Morat Sohne GmbH, Germany

[21] Appl. No.: 09/200,226

[22] Filed: Nov. 25, 1998

[30] Foreign Application Priority Data

Nov. 26, 1997 [DE] Germany ........................... 197 52 339

[51] Int. Cl.[7] ........................................................ B60Q 5/00

[52] U.S. Cl. ..................... 307/10.1; 318/128; 340/425.5; 340/457; 340/463

[58] Field of Search ................................. 307/10.1, 10.2; 180/287; 340/425.5, 426, 463, 457; 318/128

[56] References Cited

U.S. PATENT DOCUMENTS 5,307,048 4/1994 Sonders ................................ 340/425.5
5,382,948 1/1995 Richmond ............................... 340/426
5,534,845 7/1996 Issa et al. ............................. 340/425.5
5,835,868 11/1998 McElroy et al. ........................ 340/426

*Primary Examiner*—Albert W. Paladini
*Attorney, Agent, or Firm*—Pendorf & Cutliff

[57] ABSTRACT

Motor driven adjustment device with a control unit (2; 2') for controlling a motor driven unit (4) wherein an acoustic signal generator (6, 6') which produces an acoustic signal upon activation of the motor driven unit (4) is coupled at an output (21, 23) of the control unit (2; 2').

9 Claims, 2 Drawing Sheets

MOTORIZED ADJUSTING DEVICE

BACKGROUND OF THE INVENTION

1. Field of the Invention

The present invention concerns a motorized adjusting device with a control unit for controlling a motor.

2. Description of the Related Art

Adjusting devices of the type comprising an electro-motor and an electro-motor driven gear unit are finding employment, besides in many technical fields of application, increasingly also application in automobiles. Such applications include for example the adjustment of automobile seats, internal and external mirrors and the operation of automobile windows.

The investment in development, which was made with respect to the motors and in particular the gear units of this type of adjustment device, has resulted among other things in a significant reduction of the emission of noise of the motors and in particular the gears.

This effect, which at first glance appeared very positive, produced however an irritating quality particularly during use of this type of adjustment device by automobile operators. Operators are used to and expect the motor and gear unit of the adjustment device during operation to emit an audible humming, which represents feedback, indicating that the operation of an actuating element of a control unit is bringing about an adjustment process. Thus the user, for example upon an inadvertent actuation of the control element, will immediately be alerted to the fact of the thereby caused adjustment process which is particularly useful in those cases where the user does not immediately recognize the adjustment, for example, upon the opening or closing of the rear vehicle windows.

One should not however decline to use the newly developed noiseless motors and gears, since with respect to their predecessors they are more wear resistant.

SUMMARY OF THE INVENTION

An object of the present invention is thus the making available of a motor driven adjustment device, with which despite the utilization of noiseless motors and gears the user is immediately made aware of the adjustment process, so that in particular the above-mentioned disadvantages do not occur.

This object is achieved by a motor driven adjustment device which, besides the characteristic features mentioned in the introduction, includes an acoustic signal emitter coupled to the output of the control unit, which produces an acoustic signal depending upon an actuation of the motor.

The user is thus immediately aware via the acoustic signal of the adjustment of the vehicle components, such as mirrors or windows. The acoustic signal is always produced upon actuation of the motor, independent of whether the actuation of the motor at the control unit is caused by a manually operated actuation element or a sensor. Such a sensor can be for example a moisture sensor, which upon the beginning of rain produces a signal in the control unit, which causes a closing of the vehicle windows. The acoustic signal is preferably one which signals a motor noise and is respectively produced for the duration of the actuation of the motor.

Depending upon the acoustic signal generator employed, the acoustic signal generator and the motor to be controlled may be connected to a common output or separate outputs of the control unit.

Preferably, an automobile radio or an automobile radio analog is a component of the acoustic signal generator. Since almost every vehicle has a radio or a radio analog, the loud speakers of the radio or the radio analog can be used with both the radio and acoustic signal generators.

A signal delivered from the control unit to the acoustic signal generator or a signal depending therefrom is, according to various embodiments of the present invention, received by the input of the automobile radio or the automobile radio analog or, preferably by means of a signal adder, is added to an output signal of the vehicle radio. Depending upon the manner of function of the vehicle radio or the signal adder there is, during actuation of the motor, a further acoustic signal superimposed on the normal loud speaker signal of the vehicle radio, or the loud speaker signal of the vehicle radio is replaced by a further signal. The delivered signal, which is superimposed on the loud speaker signal or, as the case may be, which replaces this, is either supplied directly by the control unit or is produced by a signal generator of the acoustic signal producer, whereby the acoustic signal producer produces this signal depending upon a signal supplied by the control unit.

The present invention will now be discussed in greater detail using the following embodiments with reference to figures. There are shown:

FIG. 1: Block diagram of an inventive motor driven adjustment device according to a first embodiment of the invention;

FIG. 2: Block diagram of an inventive adjustment device according to a second embodiment of the invention;

FIG. 3: First embodiment of an acoustic signal generator according to the invention;

FIG. 4: Second embodiment of an acoustic signal generator according to the invention.

Reference numbers used in the figures correspond, unless otherwise indicated, to the same parts and functional units having the same meaning.

FIG. 1 shows a block diagram of a motor driven adjustment device according the invention. The adjustment device comprises a control unit 2, a motor-and-gear unit 4 and an acoustic signal generator 6. The illustrative components are interconnected between a supply potential V and a reference potential M. In the embodiment represented in FIG. 1 the motor driven unit 4 and the acoustic signal generator 6 are both coupled to the output 21 of a control unit 2. The control unit 2 is in the simplest case a switch, which upon closing connects both the motor driven unit 4 as well also the acoustic signal generator 6 with the supply voltage V.

FIG. 2 shows a further embodiment in the form of an inventive motor driven adjustment device, which comprises a control unit 2', a motor driven unit 4 and an acoustic signal generator 6'. The motor driven unit 4 is coupled to a first output 22 and the acoustic signal generator 6' to a second output 23 of the control unit 2'. The control unit 2' comprises in simplest case a switch 24 and a signal generator 25, wherein an output terminal of the switch 24 is connected directly with the first output terminal 22 of the control unit 2' and wherein the output terminal of the switch 24 is connected via the signal generator 25 with the second output terminal of the control unit 2'. Upon closing of the switch 24 the motor driven unit 4 and the signal generator 25 are connected to the supply voltage V. The signal generator 25 then supplies an adjustable alternating voltage signal, which is fed back to the acoustic signal generator 6' via the second output terminal 23.

This embodiment offers, in comparison to the embodiment described in FIG. 1, the advantage that as the acoustic signal generator 6' a simple loud speaker can be employed, while the acoustic signal generator 6 represented in FIG. 1 requires a signal generator for conversion of direct current voltage signal introduced the at the input of the acoustic signal generator 6.

DETAILED DESCRIPTION OF THE INVENTION

Figure 1:
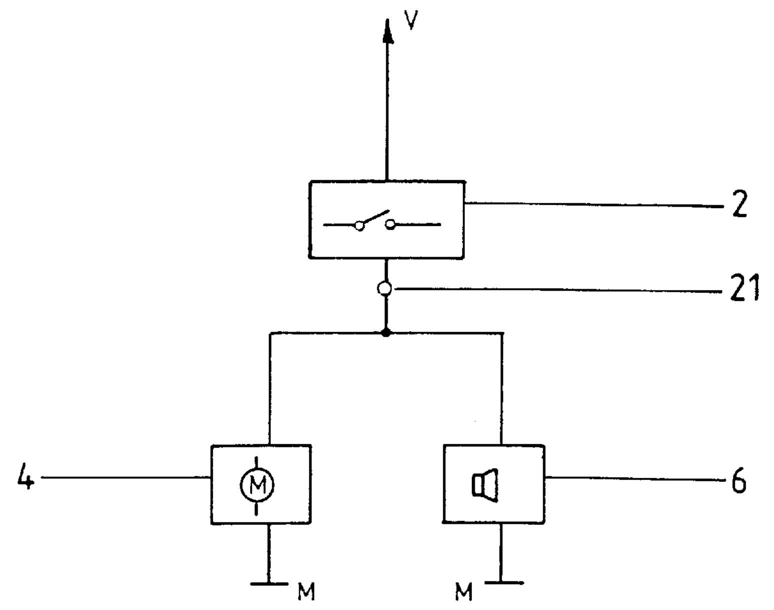
Figure 3:
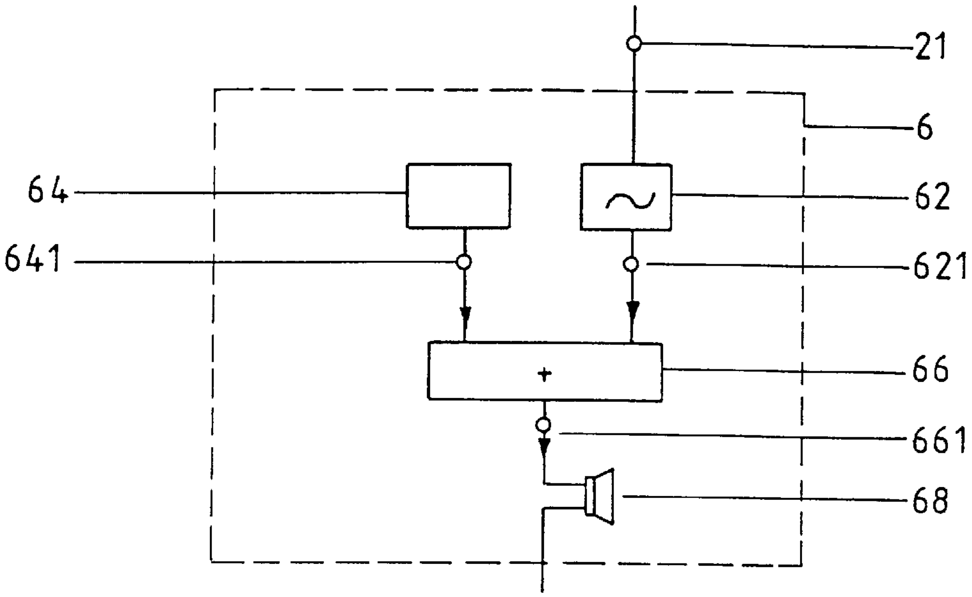
FIG. 3 shows a preferred embodiment of an acoustic signal generator 6 according to FIG. 1, wherein a vehicle radio unit 64 is part of the acoustic signal generator 6. The acoustic signal generator 6 is comprised of a signal generator 62 for producing an alternating voltage signal at an output 621 in response to a signal delivered from the output terminal 21 of the control unit 2. The alternating current signal which impinges upon the output terminal 621 of the signal generator 62 is added to the output signal supplied at an output 641 of the vehicle radio 64 via a signal adder 66. The alternating current signal impinging upon one output 661 of the signal adder 66 is made audible by means of loud speakers 68. The alternating current signal impinging upon the output 661 can in a variable relationship be formed of the output signal of the vehicle radio and the output signal of the signal generator 62. So the output signal of the vehicle radio 64 can be partially or completely be suppressed upon occurrence or presence of an output signal of the signal generator 62. The sounds produced in the loud speakers 68 via the vehicle radio 64 can thus be superimposed by a variable acoustic signal upon activation of the adjustment device, in order to signal to the user the actuation of the adjustment device.
Figure 4:
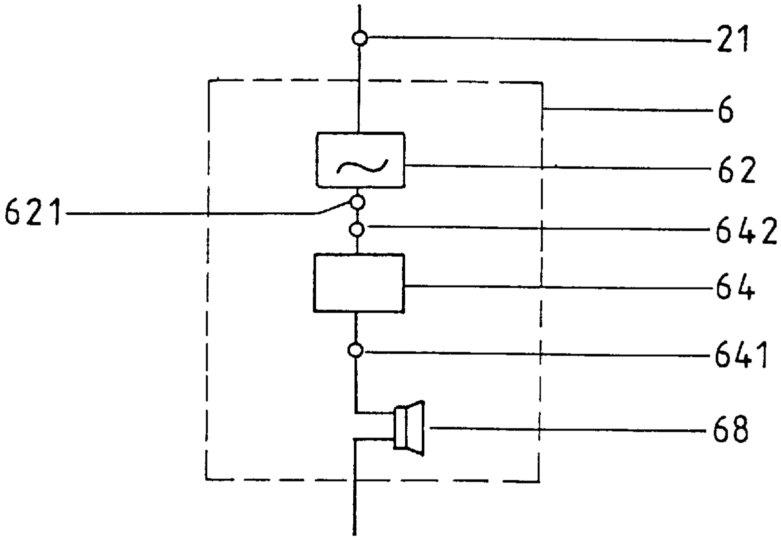

According to a further embodiment of the acoustic signal generator 6 presented in FIG. 4 it is envisioned, that the signal adjacent the output of the signal generator 62 is supplied to an input 642 of the vehicle radio, where it is further processed under consideration of the normal radio signals. A signal connected or applied to the output 641 of the radio 64 is fed to the loud speakers 68. The signal adjacent the output 641 produces in a variable adjustable relationship out of the by the signal producer 642 produced signal and the radio signals. The embodiment of the acoustic signal generator 6 represented in FIG. 3 in combination with the embodiment of the motorized adjustment device represented in FIG. 1 offers the advantage, that the hitherto conventional control units can be employed, of which the output signal is basically further processed in an acoustic signal generator. Further no changes of the automobile radio are necessary with the exemplary embodiments of the acoustic signal generators according to FIG. 3, the output signal of the radio essentially having a signal added to it by means of a signal adder which can be switched on.

Figure 2:
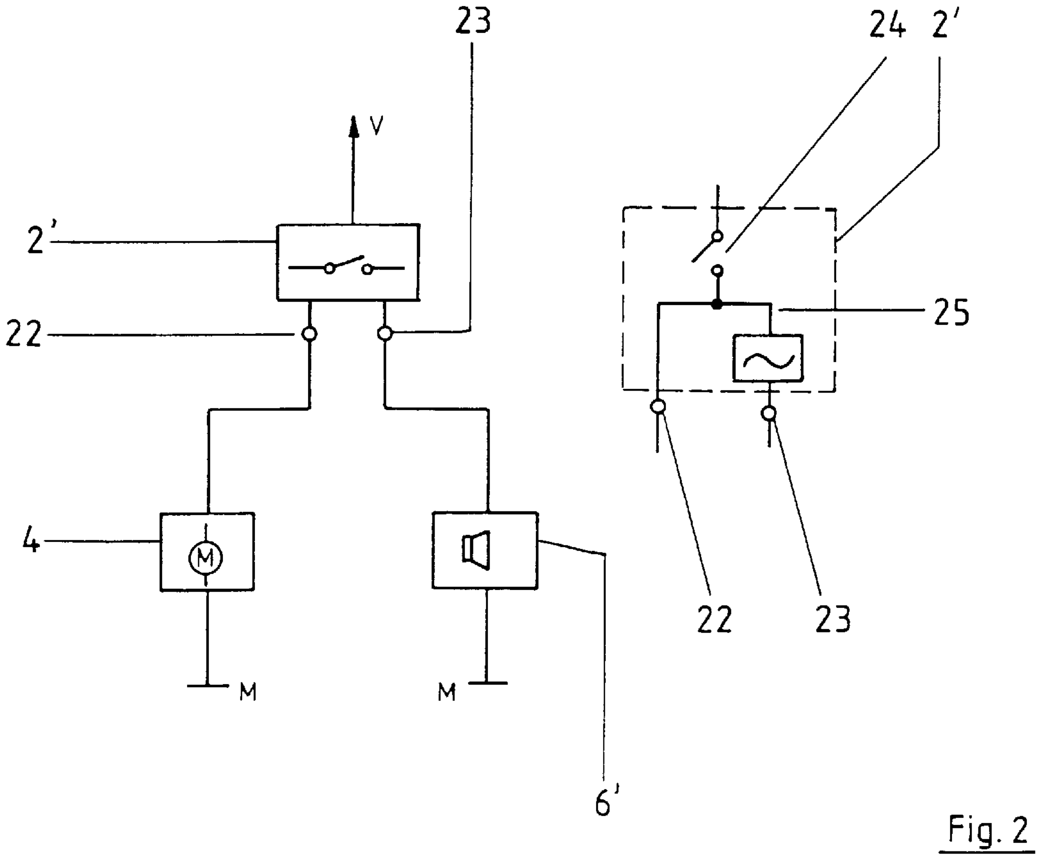

Inventive embodiments of the signal generator 6' according to FIG. 2 correspond to the embodiments of the signal generator 6 according to FIGS. 3 and 4, wherein in certain cases a signal generator 62 can be omitted, since a signal generator 25 is already provided in the control unit 2'.

The signal generators 25, 62 produce, according to a preferred embodiment, an alternating current signal, which is made audible by means of a loud speaker, and corresponds to a motor noise. For differentiating between the various adjustment devices, various motor noises can be produced. The duration of the production of the alternating current signal corresponds to the duration of the control of the motor driven unit 4 via the control unit 2, 2'.

REFERENCE NUMERAL LIST

2, 2' Control unit
4 Motor driven unit
6, 6' Acoustic signal generator
21 Common output of the control unit
22 First output of the control unit
23 Second output of the control unit
24 Switch
25 Signal generator
62 Signal generator
64 Automobile radio
66 Signal adder
68 Loud speaker
621 Output of the signal generator
641 Output of the automobile radio
661 Output of the signal adder
642 Input of the automobile radio

What is claimed is:

1. Motor driven adjustment device including a control unit (2; 2') for adjustment of a motor driven unit (4), wherein an acoustic signal generator (6, 6') which produces an acoustic signal upon activation of the motor driven unit (4) is connected to a output (21, 23) of said control unit (2; 2') to emit an audible humming mimicking the sound of an electric motor only while said motor of said motor driven unit is activated.

2. Device according to claim 1, wherein the motor driven unit (4) and the acoustic signal generator (6) are coupled parallel to a common output (21) of the control unit (2).

3. Device according to claim 1, wherein the motor driven unit (4) is coupled to a first output (22) and the acoustic signal generator (6') is coupled to a second output (23) of the control unit (2').

4. Device according to claim 1, wherein the motor driven adjustment is a part of an adjustment device for mirror, vehicle seats, windows or the like in automobiles.

5. Device according to claim 1, wherein the automobile radio (64) is part of the acoustic signal generator (6, 6').

6. Device according to claim 5, wherein said common output (21) or said second output (23) of the control unit (2, 2') is connected with an output (642) of the automobile radio (64).

7. Device according to claim 1, wherein the acoustic signal generator (6) and/or the control unit (2') includes a signal generator (62; 25) for production of an alternating current signal.

8. Device according to claim 7, wherein an output (621) of the signal generator (62) is connected with an input (642) of the automobile radio (64).

9. Device according to claim 7, wherein an output (621) of the signal generator (62) is added by means of a signal adder (66) to a signal connected to an output (641) of the automobile radio (64).

* * * * *